United States Patent [19]

Impink, Jr.

[11] Patent Number: 4,774,050

[45] Date of Patent: Sep. 27, 1988

[54] AXIAL POWER DISTRIBUTION MONITOR AND DISPLAY USING OUTPUTS FROM EX-CORE DETECTORS AND THERMOCOUPLES

[75] Inventor: Albert J. Impink, Jr., Murrysville, Pa.

[73] Assignee: Westinghouse Electric Corp., Pittsburgh, Pa.

[21] Appl. No.: 850,195

[22] Filed: Apr. 10, 1986

[51] Int. Cl.[4] .............................................. G21C 17/00
[52] U.S. Cl. .................................. 376/245; 376/216; 376/255; 376/247; 376/259; 376/248
[58] Field of Search .............. 376/245, 247, 255, 259, 376/216, 248, 214, 254; 250/391

[56] References Cited

U.S. PATENT DOCUMENTS

| | | | |
|---|---|---|---|
| 3,752,735 | 8/1973 | Musick et al. | 376/259 |
| 4,069,097 | 11/1978 | Frank | 376/254 |
| 4,079,236 | 2/1978 | Graham et al. | 376/255 |
| 4,297,581 | 10/1981 | Brunson et al. | 250/391 |
| 4,318,778 | 3/1982 | Musick | 376/216 |
| 4,330,367 | 5/1982 | Musick | 376/245 |
| 4,400,343 | 8/1983 | Izumi et al. | 376/214 |
| 4,552,718 | 11/1985 | Impink, Jr. et al. | 376/216 |
| 4,568,513 | 2/1986 | Book et al. | 376/248 |
| 4,585,609 | 4/1986 | Le Ray | 376/245 |
| 4,608,223 | 8/1986 | Twilley, Jr. | 376/245 |
| 4,632,802 | 12/1986 | Herbst et al. | 376/259 |

FOREIGN PATENT DOCUMENTS 0127532 12/1984 European Pat. Off. .
2343313 9/1977 France .

*Primary Examiner*—Salvatore Cangialosi
*Attorney, Agent, or Firm*—D. C. Abeles

[57] ABSTRACT

A method and apparatus for generating core-average and radially peaked, pointwise core axial power distributions of a nuclear reactor core from monitored responses of reactor flux obtained exterior of the core, such as responses obtained from ex-core power range nuclear detectors, and from responses of temperature obtained from selected core-exit thermocouples.

30 Claims, 5 Drawing Sheets

AXIAL POWER DISTRIBUTION MONITOR AND DISPLAY USING OUTPUTS FROM EX-CORE DETECTORS AND THERMOCOUPLES

BACKGROUND OF THE INVENTION

1. Field of the Invention

This invention relates in general to apparatus and a method for monitoring a system operation and more particularly to such apparatus and method for monitoring and visually displaying an axial power distribution within the core of a nuclear reactor that employs parameters that are monitored exterior to the reactor core.

2. Description of the Prior Art

The controlled release of large amounts of energy through nuclear fission is now quite well known. In general, a fissionable atom such as $U^{233}$, $U^{235}$, or $PU^{239}$ absorbs a neutron in its nucleus and undergoes a nuclear disintegration. This produces on the average, two fission products of lower atomic weight and great kinetic energy, several fission neutrons, also of high energy, and fission gamma rays.

The kinetic energy of the fission products is quickly dissipated as heat in the nuclear fuel. If, after this heat generation, there is at least one neutron remaining which induces a subsequent fission, the fission reaction becomes self-sustaining and the heat generation is continuous. The heat is removed by passing a coolant through heat exchange relationship with the fuel. The reaction may be continued as long as sufficient fissionable material exists in the fuel to override the effects of fission products and other neutron absorbers which may also be present and neutron leakage.

In order to maintain such fission reactions at a rate sufficient to generate useful quantities of thermal energy, nuclear reactors are presently being designed, constructed and operated in which the fissionable material or nuclear fuel is contained in fuel elements which may have various shapes, such as plates, tubes or rods. These fuel elements are usually provided on their external surfaces with a corrosion resistant, non-reactive cladding which contains no fissionable material. The fuel elements are grouped together at fixed distances from each other in a coolant flow channel or region as a fuel assembly, and a sufficient number of fuel assemblies are arranged in a spaced array to form the nuclear reactor core capable of the self-sustained fission reaction referred to above. The core is usually enclosed within a reactor vessel.

Commonly, in pressurized water reactors, a neutron absorbing element is included within the cooling medium (which also functions as a moderator) in controlled variable concentrations to modify the reactivity, and thus the rate of heat generation within the core, when required. In addition, control rods are interspersed among the fuel assemblies, longitudinally movable axially within the core, to control the core's reactivity and thus its power output. There are three types of control rods that are or have been employed for various purposes. Full length rods, which extend in length to at least the axial height of the core, are normally employed for reactivity control and, in a number of current applications, for axial power distribution control as well. In other current applications, part length control rods, which have an axial length substantially less than the height of the core, are specifically used for axial power distribution control. In addition, reactor shut-down rods are provided for ceasing the sustained fissionable reaction within the core and shutting down the reactor. The part length rods, when used, and the full length rods are arranged to be incrementally movable into and out of the core to obtain the degree of control desired.

As a by-product of the fissionable reaction, both through a process of beta decay of radioactive iodine-135 and, by direct yield from the fission reaction, xenon-135 is created. Xenon-135 has the property of having a uniquely large neutron cross section and, therefore, has a significant effect on the power distribution within the core and on overall core reactivity. While other forms of reactivity management are directly responsive to control, the xenon concentration within the core creates serious problems in reactor control in that it gives rise to an unavoidable short term positive feedback mechanism. It exhibits a relatively long decay period and requires up to approximately 40 hours after a power change to reach a steady state value.

Short and long term transients in the core axial power distribution have created problems throughout the history of reactor operation for several reasons. Normally, coolant flow through the fuel assemblies is directed from a lower portion of the core to the upper core regions, resulting in a temperature gradient axially along the core. Changes in the rate of the fission reaction, which is temperature dependent, will thus vary the axial power distribution. Normal design practice insures that axial moderator temperature variations are always characterized by negative local and core average feedback effects. Secondly, the axial variation in the power distribution varies the xenon axial distribution which further accentuates the variations in power axially along the core. This can lead to a xenon induced axial power distribution oscillation which can be unstable and which requires continuous corrective operator intervention. Thirdly, insertion of control rods from the top of the core, without proper consideration of the past operating history of the reactor, can worsen the axial power peaking. Unlimited axial power peaking or excessive rates of change of power peaking will result in fuel failure and release of radioactive material into the coolant.

The series of changes in reactor core power output in a nuclear electrical generating plant that must be made in order to accommodate the daily changes in electrical demand that commonly occur in a typical electrical utility grid is generally referred to as load follow. One load follow control program currently recommended by reactor vendors utilizes the movement of the full length control rods for power level increases and decreases and the part length control rods to control xenon induced spatial axial power oscillations and to shape the axial power profile. Typically, changes in reactivity associated with changes in the xenon concentration are generally compensated for by opposing changes in the concentration of the neutron absorbing element within the core coolant or moderator. Some vendors have identified and recommended load follow programs or strategies that utilize appropriate timed movement of the full length control rods. This is done to compensate for the effects of power level changes on overall core reactivity and, at least in part, to prevent the establishment of unacceptable axial power distributions caused by spatial xenon-135 transients induced by power level changes and control rod movement. In these strategies, part length control rods are not needed for axial power distribution control and, as a result, they are commonly not installed in the reactors manufactured by those vendors. In either mode of operation, the control rods, either part length or full length, are moved to maintain a parameter called the axial offset within some prespecified band, typically within the range of + or −15%.

The axial offset is a useful parameter for characterizing the axial power distribution and is defined as:

$$AO = (P_t - P_b)/(P_t + P_b) \quad (1)$$

where $P_t$ and $P_b$ denote the fraction of power generated in the top half and bottom half of the core, respectively.

The concept of axial offset derives from the earliest attempts to synthesize, on the basis of readily measurable quantities, the core average axial power distribution in an operating nuclear power reactor. In these early efforts, the core average axial power distribution was commonly approximated by a Fourier series of sine functions bounded by the extrapolated axial length of the core:

$$q(z) = A_1 \sin(\pi^* z/Z) + A_2 \sin(2^* \pi^* z/Z) + \quad (2)$$
$$A_3 \sin(3^* \pi^* z/Z) + A_4 \sin(4^* \pi^* z/Z) + A_5 \sin(5^* \pi^* z/Z) + \ldots$$

or $$q(z) = A_1 \{ \sin(\pi^* z/Z) + (A_2/A_1)\sin(2^* \pi^* z/Z) + \quad (3)$$
$$(A_3/A_1)\sin(3^* \pi^* z/Z) + (A_4/A_1)\sin(4^* \pi^* z/Z) +$$
$$A_5 \sin(5^* \pi^* z/Z) + \ldots \}$$

where
- q(z) is a measure of core average axial power level, in units of kw/ft for example;
- Z represents the extrapolated core height; and
- z represents axial elevation above the extrapolated lower core limit.

It was early recognized, granted a few acceptable simplifying assumptions, that the ratio $A_2/A_1$ appearing in eqn. (3) could be correlated directly with the axial offset parameter defined by eqn. (1). Thus, the assupton was made, early on, that effective first order control of the core average axial power distribution could be established and maintained by adjusting either full length or part length control rod position in the core, as necessary, to hold the axial offset parameter value within prespecified limits. In actual practice, since the values of $P_t$ and $P_b$ in eqn. (1) can not conveniently be observed directly, an alternative measurable parameter, commonly called the ex-core axial offset, is defined as:

$$AO_{ex\text{-}core} = (I_t - I_b)/(I_t + I_b) \quad (4)$$

where $I_t$ and $I_b$ are the compensated electrical currents generated, respectively, by the top and bottom ex-core neutron detectors of a two-section excore detector system. It was early noted, and consistently observed, that the true axial offset in the reactor core, as defined by eqn. (1), was reliably related to the readily measurable ex-core axial offset of eqn. (4) by the following:

$$AO = a + b^* AO_{ex\text{-}core} \quad (5)$$

By repeated analysis of experimental data from a wide spectrum of operating nuclear power reactors manufactured by the present assignee, the value of the parameter a has been found to always be close to 0.0 and the value of the parameter b has been found to fall in the range 1.3 to 1.8.

However, the currents produced by the top and bottom ex-core detectors of conventional two-section ex-core long ion chamber detector systems provide sufficient information to permit evaluation of only the first two coefficients $A_1$ and $A_2$ of the expansion in eqn. (1), thereby limiting the expansion to the first two terms.

More recently however, it has been shown in the art, that in practical situations, relatively large uncertainties must be associated with estimates of the location and amplitude of peak values in axial power profiles constructed on the basis of the responses of the detectors in typical two-section "long ion chamber" ex-core neutron detector configurations. For one thing, axial power pinching, which results in a large axially centered power peak, can occur with a low or zero axial offset. The mere prospect that such axially centered power peaks could occur and could pass undetected by the existing power distribution monitoring system could result in a reactor power penalty. Under current licensing criteria, this would require that the reactor be operated at a reduced power level in order that such potential peaks could not exceed conservative specified magnitudes. Alternatively, axial power flattening, which results in an axially centered depression in the axial power profile and in the appearance of two axially symmetric regions of unusually high power density near the top and bottom of the reactor core, can also occur. This, too, could pass undetected if a conventional two section ex-core neutron detector system were the only monitoring system in use. This potential presence of a region of unusually high power density near the top of the core could cause significant concerns regarding the possibility of the undetected establishment of a departure from nucleate boiling condition in that region. Here again, the mere prospect that such a situation could arise, could again result, under current licensing criteria, in a derating of the allowable power level at which an affected nuclear power reactor is permitted to operate to insure that the projected condition could not arise.

As the significance of these somewhat more subtle characteristics of core average axial power distribution became apparent, two basic approaches to axial power distribution monitoring and control emerged. One approach followed the route of developing enhanced monitoring hardware. Initially, such hardware included ex-core neutron detector arrangements in which more than two neutron detectors were combined in a single grouping, wherein each detector "sees" a different axial region of the peripheral region of the reactor core immediately adjacent to the location of the ex-core detectors. Subsequently, such hardware included fixed in-core neutron or gamma ray detectors that are installed within the active region of the core. These detectors provide direct responses characteristic either of the local neutron flux level or of the local gamma ray flux level. As is well known, as the number of detectors monitoring the nuclear processes in successive axial regions of a radially common portion of a reactor core is increased, so does the precision with which the axial power distribution can be synthesized. In simple terms, for each additional axially independent detector added to the hardware arrangement of an overall axial detector configuration, one additional term can be added to the Fourier sine expansion of eqn. (2) or (3) and the resulting precision in axial power distribution synthesis improves thereby.

The alternative approach that emerged in response to the realization that higher order components of the core average axial power distribution could have significant effects on reactor core operability and ultimately on reactor safety was one of retaining the basically simple and rugged two-section ex-core neutron detector hardware, the so-called "long ion chamber" arrangement, and evolving operating strategies that guaranteed, by prior analysis, that no unacceptably adverse axial power distributions could be established if the constraints of the specified operating strategies were faithfully observed. As a consequence of this alternative approach, a significant number of currently operating nuclear power reactors in various nations in the world, including to a large degree, those operating nuclear power reactors in the United States, have installed only two-section ex-core neutron detector systems or arrangements and have a small possibility, given current nuclear power reactor licensing policy and constraints, of utilizing ex-core neutron detector arrangements consisting of more than two sections of axially independent neutron detectors. The alternative option of installing more multisection neutron detector arrangements exists, but it is not considered commercially viable by the operators of the affected nuclear power plants. It is to be noted that in all operating nuclear power plant installations in which only two-section neutron detector arrangements are provided, there are also provided the means for periodically obtaining very precise measurements of the actual three dimensional core power distribution. This is accomplished by utilizing an installed movable in-core detector system. These installations are also routinely supplied with a core-exit thermocouple system which allows the continuous, on-line monitoring of the coolant temperature at the exit of about one fourth of the fuel assemblies and provides, therefore, the ability to infer values of coolant enthalpy rise (i.e. total local thermal power) at each monitored location. Hitherto, little use has been made of the information available from the core-exit thermocouple system.

Some drawbacks of the alternative approach of using only the movable in-core system and the two-section ex-core detector system arrangement for power distribution monitoring include:

- lack of an on-line, real-time knowledge of core axial power distribution which leads to uncertainty in determining the margin to various core limits. The uncertainty directly affects the operating margin for the plant in performing load follow and other maneuvers.
- lack of a detailed on-line, real-time core axial power distribution calculation which precludes the ability to determine axial xenon and iodine distributions which are helpful in inferring the future behavior of the core. Such an inference is valuable in operating various systems, for example boron systems, in an anticipatory manner to avoid potentially undesirable power distributions.

To establish an effective load follow capability, a substantially constant axial power profile will have to be maintained or the axial power profile will have to be continuously managed throughout load follow operation. However, to effectively maintain a substantially constant axial flux profile or to continuously manage the axial flux profile, a monitoring system is required that has the capability of substantially reconstructing the axial flux pattern within the core so that variations therein can be accurately compensated for before a xenon maldistribution is effected.

If one more term, $A_3 \sin(3*\pi*z/Z)$, representing the so-called "second overtone" of the power distribution, is included in the expansion of eqn. ('), the uncertainties are reduced significantly and the resulting estimate of power shape is usable for power peaking and other analysis. The first three terms of the expansion carry most of the information regarding the effects of current operating conditions, power level and control rod position in particular as well as some of the effects of burnup on axial power distribution. Addition of a fourth term of the form $A_4 \sin(4*\pi*z/Z)$, which term is relatively insensitive to either short term or long term operating conditions, provides relatively little further improvement in the power shape definition. The fifth term embodies most of the long term, i.e., burnup dependent, effects on axial power distribution and so its coefficient changes quite slowly as the axial burnup distribution in the core changes.

Thus, a need exists for a method and apparatus for monitoring the information available from the ex-core detectors, as well as information available from other ex-core detectors, to produce an estimate of the core axial power distribution over the entire height of the core which is suitably accurate for use as a primary diagnostic tool in operating a nuclear reactor.

SUMMARY OF INVENTION

The method and apparatus of the present invention overcomes the inadequacies of the alternative approach of the prior art, without incurring the economic costs of the first basic approach, by providing an axial power monitor (APM) which uses reactor flux signals monitored externally of the core, such as signals from ex-core power range nuclear detectors, and signals from selected core-exit thermocouples, to generate both core-average and radially peaked, pointwise core axial power distributions. The radially peaked axial power distribution is displayed along with the corresponding licensed limit to directly illustrate the current available margin.

More specifically, as illustrated in the exemplary embodiments set forth hereinafter, the APM synthesizes an axial power distribution by using signals from ex-core nuclear detectors, for example long ion chambers, whose axial fields of vision either overlap or underlap, preferably by approximately one third of the total core height, and signals from selected core-exit thermocouples.

In particular, when the core is monitored by two-section power range ex-core detectors, signals from selected core-exit thermocouples and a core inlet temperature indicator produce a locally averaged thermal power value appropriate to the peripheral region of the core seen by the long ion chamber. This locally averaged thermal power value, together with compensated signals from the top and bottom detectors of the long ion chamber, are used to generate a locally averaged axial power distribution representative of the peripheral region of the core nearest the long ion chamber. This axial distribution for the peripheral region is then used to construct the core average axial power distribution for plant operator guidance purposes and the radially peaked core axial power distribution for surveillance purposes.

As described below in regard to the preferred embodiment, the APM also includes means for receiving information regarding (1) a detailed map of the core axial power distribution, (2) core power level, and (3) control rod position, all for normalization and calibration purposes. The detailed map of the core axial power distribution is obtained from in-core flux maps produced by the movable in-core flux map system. The in-core flux maps are used to periodically recalibrate the ex-core neutron detectors and the core-exit thermocouples to maintain system accuracy.

BRIEF DESCRIPTION OF THE DRAWING

A full understanding of the invention can be gained from the following description when read in conjunction with the accompanying drawings in which.

To facilitate understanding, identical reference numerals are used to designate elements common to the figures.

DESCRIPTION OF THE PREFERRED EMBODIMENT

Figure 1:
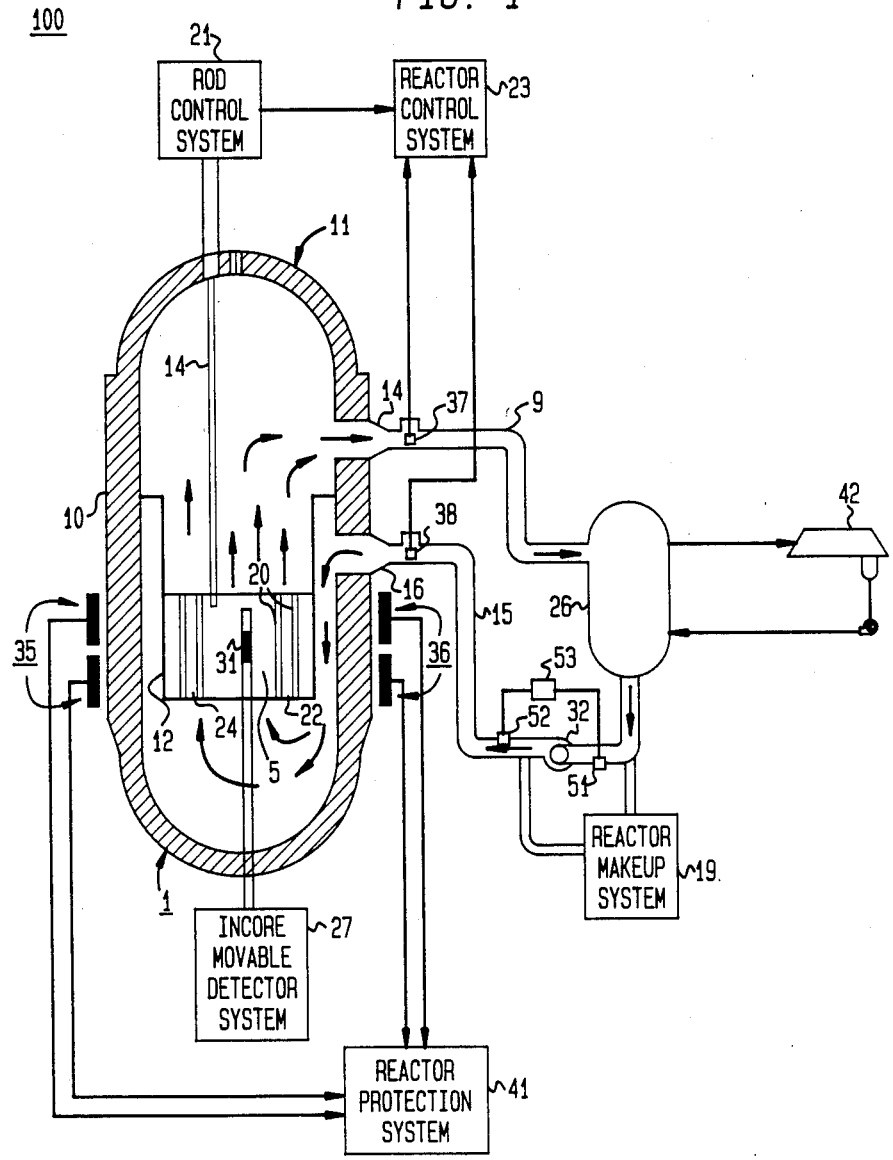
FIG. 1 is a schematic diagram of a typical nuclear steam supply system which includes a pressurized water reactor (PWR)

FIG. 1 shows a schematic representation of a nuclear steam supply system 100 for generating electric power. The system 100 includes a typical pressurized water reactor (PWR) 1 which can employ the method and apparatus of the present invention to more accurately monitor the axial flux profiles within the core to avoid the operating difficulties experienced by the prior art. As shown in FIG. 1, PWR 1 includes a vessel 10 which forms a pressurized container when sealed by its head assembly 11. The vessel 10 has coolant flow inlet means 16 and coolant flow outlet means 14 formed integral with and through its cylindrical walls. As is known in the art, the vessel 10 contains a nuclear reactor core 5 of the type previously described consisting mainly of a plurality of clad nuclear fuel elements 20 (only a few of which are shown) arranged in assemblies, for example assemblies 22 and 24, which generate substantial amounts of heat, depending primarily upon the position of the full length control rods such as 14.

Fission reactions within the core 5 generate heat which is absorbed by a reactor coolant, for example light water, which is passed through the core 5. The heat is conveyed from the core by coolant flow entering through inlet means 16 and exiting through outlet means 14. Generally, the flow exiting through outlet means 14 is conveyed through an outlet conduit, hot leg 9, to a heat exchange steam generator system 26, wherein the heated coolant flow is conveyed through tubes which are in heat exchange relationship with water which is utilized to produce steam. The steam produced by the generator is commonly utilized to drive a turbine-generator 42 to produce electric power. The cooled reactor coolant is conveyed from the steam generator 26 through a cold leg conduit 15 by reactor coolant pump 32 to inlet means 16. After being delivered to the reactor pressure vessel 10 through inlet means 16, the coolant is forced to circulate downwardly around the outside of a barrel assembly 12 and upward through the interior of the core 5, through coolant channels formed by the assemblies, whereby the reactor coolant cools the core 5 and its fuel rods 20. A pressurizing system (not shown) is provided to maintain the pressure of the reactor coolant with certain acceptable limits. Thus, a closed recycling primary loop is provided with the coolant piping coupling the vessel and the steam generator. The vessel illustrated in FIG. 1 only shows one steam generator for clarity, however, it is adaptable for much more than one such closed fluid system or loop, though, it should be understood that the number of such loops varies from plant to plant and commonly two, three, or four are employed.

The reactivity of reactor core 5 is controlled by dissolving a neutron absorber, such as boron, in the reactor coolant, and by the insertion into the core of control rods, for example control rod 14. The boron concentration of the reactor coolant is regulated by a reactor makeup system 19 which extracts coolant from the cold leg 15 upstream of the reactor coolant pump 32, adds or removes boron as appropriate, and returns the coolant with the proper boron concentration to the cold leg 15 downstream of the pump 32. The control rods, such as control rod 14, which are made of neutron absorbing material, are inserted into and withdrawn from the reactor core 5 by a rod control system 21. The rod control system 21 receives commands from a reactor control system 23. Typically, control rods are moved in groups, which groups are referred to as control rod banks. This rod control system 21 is well known in the art and provides the position of every control rod for purposes, as will be explained in detail below, of determining certain factors to be used in the calculation of the axial power distribution.

Ex-core neutron detectors such as the detectors in detector systems 35 and 36 monitor the neutron flux, and therefore the power level of reactor core 5. In addition, most PWRs are provided with an in-core movable detector system 27 for detecting neutrons which includes a number of thimbles 29 distributed across the core 5 through which movable detectors 31 may be inserted to generate a detailed map of the power distribution in the core. Such mapping is performed periodically, such as monthly, to determine if there are any potential or actual limiting hot spots in the core.

Some PWRs are provided with a fixed in-core detector system (not shown) in which strings of detectors are permanently positioned in thimbles similar to thimbles 29. These installations do not require the in-core movable detector system 27, but they are expensive and hence are not universally used.

In the production of thermal power within the core, important parameters affecting the axial power distribution, as previously explained, are the level of insertion of the full length rods and the part length rods, if provided, the coolant inlet temperature, the power level of the reactor, the fuel burnup distribution, and the xenon-135 distribution. Without constant surveillance of the axial flux distribution throughout the axial height of the core, it would be imperative to operate the reactor in an essentially static manner with minimal changes in any of the parameters that affect power distribution and it would not be possible to achieve a load follow capability. These important parameters are measured from information obtained from the control rod position system 21, the core-exit thermocouples, the resistance temperature detectors within the coolant piping, such as temperature detectors 37 and 38, and the ex-core neutron detector systems 35 and 36 illustrated in FIG. 1.

Presently, in some operating plants, the ex-core detector systems 35 and 36 are divided midway along the axial height of the core to provide two independently responsive flux sensitive areas, respectively, proximate the upper and lower core sections. The difference in outputs between the upper and lower detector sections, normalized to the relative power of the core, provides a measure of the axial offset that is normally employed to maintain a relative balance between the flux distribution within the upper and lower portions of the core, as previously explained. Normally, the ex-core detector arrangements are positioned symmetrically around the core in an operating reactor.

Figure 2:
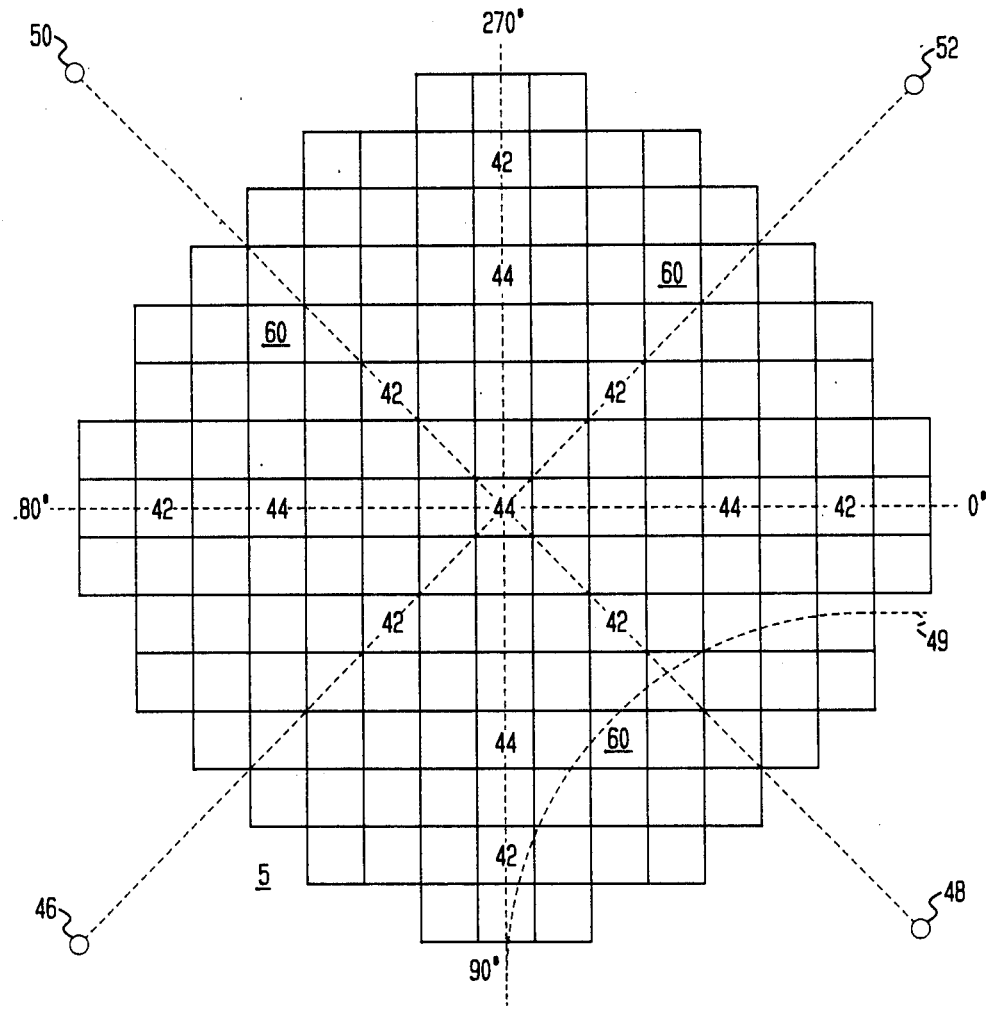
FIG. 2 is a core map which is a plan view of the reactor core of a PWR.

FIG. 2 illustrates a plan view of a typical pressurized water reactor nuclear core 5. The core locations 42 and 44 respectively identify the typical full length control rod locations employed during full power operation. The remaining core locations 60 generally refer to fuel assembly positions with some positions reserved for other control applications. It can thus be appreciated that the reactor core is designed to be symmetrical about its central axis. During power operation, the power distribution in the core is monitored at a plurality of ex-core detector locations 46, 48, 50, and 52, symmetrically positioned around the periphery of the vessel. Each detector provides corresponding flux information on the adjacent quadrant of the core. Although, in this particular embodiment, the core is shown as separated into quadrants by the detector assemblies located on core diagonals, it should be appreciated that the quadrants could also be defined by locating the detector assemblies on the core flats at the 0°, 90°, 180° and 270° locations. Thus in the embodiment illustrated, the flux measurements detected by the detector at location 52 are representative of the power generated in the core quadrant bounded by the 0° axis and the 270° axis, each of which bisects the horizontal plane of the plan view illustrated in FIG. 2 and should be distinguished from the vertical core axis over which the axial flux profile is measured. It should be appreciated from the symmetrical arrangement of core components that the power in each quadrant of the core will be representative of the power in each of the other core quadrants.

Figure 3:
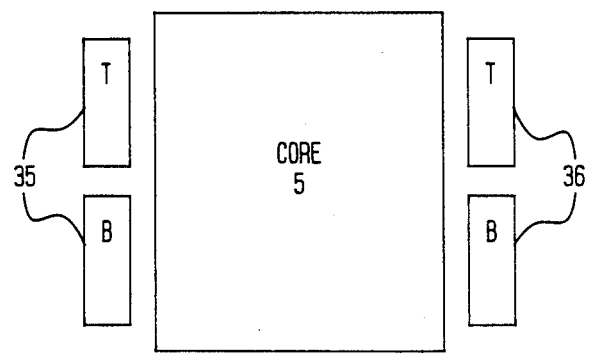
FIG. 3 is an elevation view of a PWR which shows the relative position of ex-core detectors.

FIG. 3 illustrates a schematic elevation or axial view of the core 5 having two detector systems 35 and 36 symmetrically positioned about core 5. Each of the detectors comprises discrete detector sections symmetrically positioned and respectively identified T and B, corresponding to the top and bottom locations along the axial length of the core. The following description will address the processing of outputs from each of the detector arrangements, along with other outputs, in accordance with the present invention.

In present practice, there are thermocouples installed at or just above the outlet nozzles of a fraction of the fuel assemblies in most commercial pressurized water nuclear power reactors. These thermocouples will be referred to hereinafter as core-exit thermocouples. Typical reactor cores generally consist of from approximately one hundred to more than two hundred assemblies and the thermocouples are usually located at approximately one out of four fuel rod assemblies.

Typically, an on-line plant process control computer periodically samples the thermocouple voltages and converts the electrical samples to convenient engineering units, $O_F$ or $O_C$. The plant computer also converts the core coolant outlet temperature values at the measured locations to equivalent $F_H$ values, i.e. the relative enthalpy rise, at those locations.

Figure 4:
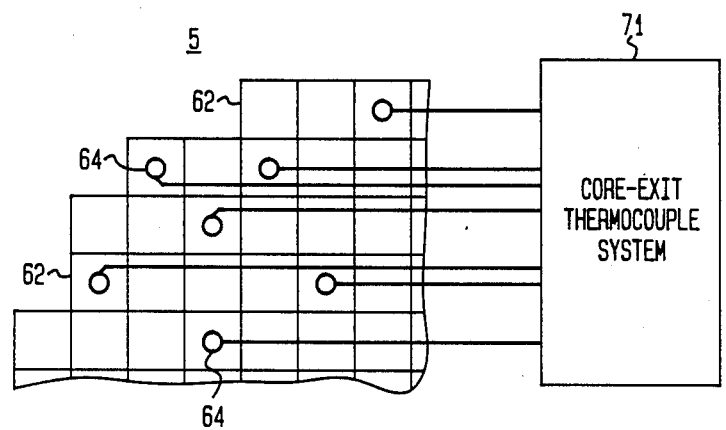
FIG. 4 is a plan view of the reactor core of a PWR which shows the relative position of fuel rod assemblies and an exemplary arrangement of core-exit thermocouples within the fuel assembly locations.

A plan view of a section of reactor core 5 illustrating the relative position of the fuel rod assemblies 62, along with an exemplary arrangement of the thermocouples 64 within the fuel assembly locations 62, is shown in FIG. 4.

Generally, in accordance with the method of the present invention, the value of the flux at each coordinate along the axial length of the core can be established from the electrical outputs of the ex-core neutron flux detectors and the core-exit thermocouples, respectively, algebraically modified by corresponding pre-established constants obtained from initial calibration, and recalibrated periodically during the course of core life with depletion of the fuel. It should be further appreciated that these constants depend to a large degree on the physics of the core and will thus vary from plant to plant and from fuel cycle to fuel cycle.

The overall details of the present invention will be described with reference to FIG. 5. Because rod shadowing, the effect of rod insertion on the peripheral axial flux distribution relative to the core average power distribution, has a significant detrimental effect on the accuracy of synthesized core average axial power distributions, in accordance with the present invention, the locally averaged axial power distribution in the peripheral fuel assemblies nearest the ex-core detectors at locations 46, 48, 50, and 52 shown in FIG. 2 is synthesized using a locally averaged thermal power indication derived from core-exit thermocouples installed above some of the appropriate peripheral fuel assemblies. The ex-core detectors in detector system 35 are sensitive to the leakage neutron flux from the reactor core 5 and the neutron flux "seen" by each detector of the ex-core detector system 35 is dependent upon the axial flux distribution near the core periphery, the radial flux distribution near the core periphery, and the transport, slowing down and capture of neutrons leaking from the core periphery to the point of incidence with the ex-core detectors in detector system 35. For example the appropriate peripheral fuel assemblies for an ex-core detector located at position 48 in FIG. 2 are typically those included between the location 48 and dotted curve 49. In this manner, the accuracy of the axial power distributions synthesized over an adequate range of typical plant operating conditions is entirely acceptable for core surveillance. Typically, the correlation of the ex-core detector signals with the power distribution in the adjacent peripheral region of the core is influenced by two effects. The first effect is frequently referred to in the art as shape annealing. Shape annealing, or the relative effect of contributions of the core peripheral axial flux distribution to a given detector, is due to the placement of the ex-core detector 35 away from the core periphery. As a result, the ex-core detectors 35 "see" a distorted peripheral flux distribution due to the scattering and diffusion of neutrons between the periphery and the detector locations. The shape annealing effect is dependent only upon the geometric location of the detectors in ex-core detector system 35 and does not depend on the axial flux distribution. The second effect is related to coolant temperature in the "downcomer" region—as shown in FIG. 1, the reactor coolant cool leg flow path is such that the reactor coolant flows along the vessel 10 to cool it on the return path which is referred to in the art as a "downcomer." The correction for inlet temperature change is necessary because the detector responses are dependent upon the diffusion and absorption of neutrons that occur between the core periphery and the detector locations. As a result, the total neutron leakage out of the reactor vessel, and the the ex-core detector response, is affected by the reactor coolant which has temperature dependent neutronic properties. This effect is defined as temperature shadowing and has the characteristic of causing a decrease in detector response for a decrease in inlet temperature. For example, water attenuates neutrons better if it is cooler and the temperature of the water in the cool leg affects the measurements produced by the ex-core detectors by as much as 0.6% in signal strength for each degree (°F.) change in temperature. It has been experimentally determined that there is a linear relation between the cool leg temperature and the output from the ex-core neutron detectors over the expected range of temperature variation. The temperature shadowing effect is virtually independent of the power distribution at the peripheral core assemblies.

Since, as has been discussed hereinabove, the $A_5$ coefficient in the Fourier expansion of the core axial power distribution in eqn. (2) is effectively time invariant, at least over time intervals of one to several months, a suitable axial power distribution synthesis expression for the locally averaged peripheral axial power distribution in accordance with the present invention takes the form:

$$p_j = \sum_{i=1}^{I} A'_{ij} * (\text{Sensor Response})_i \tag{6}$$

in which the i subscript refers to sensor responses from the sensors whose responses are monitored, the j subscript refers to successive discrete axial elevations in the fuel region of the core 5, and the expansion coefficients, $A'_{ij}$, implicitly incorporate the effects of the axial burnup distribution, of detailed physical fuel characteristics, such as grids, and the shape annealing effect. Thus, in accordance with the present invention, the assumption made in forming eqn. (6) is that the contribution of each of the sensors to the synthesized axial power distribution can be treated as linear in form.

In the application of the inventive method to a typical PWR in normal use, as shown in FIG. 1, the sensor responses shown in eqn. (6) correspond to the two output currents of a properly positioned conventional ex-core two-section long ion chamber, such as the ex-core detector system 35 or 36, plus a third signal that is proportional to the reactor thermal power level in the peripheral region of the core which is "seen" by the ex-core detector 35 (As described above the peripheral region "seen" by the ex-core detector is, for example, the region bounded by dotted curve 49 in FIG. 2). One example of a third signal which adequately serves in the present invention to evaluate the $A'_{1j}$, $A'_{2j}$ and $A'_{3j}$ expansion coefficients of eqn. (6) is the enthalpy rise signal generated by taking the difference between the enthalpy corresponding to the average temperature measured by the local peripheral core-exit thermocouples 64 and the enthalpy corresponding to the cold leg temperature measured by the resistance temperature detector 38. By using the above-described sensor responses, the present invention advantageously provides an axial power distribution which includes the effects of the third term in the Fourier expansion, even when only two-section ex-core detector systems, like ex-core detector systems 35 and 36 shown in FIG. 1, are available.

In order to achieve the above-described advantage obtained from embodiments of the present invention, namely the determination of third order effects in a Fourier Expansion of the axial power distribution when sensor signals are obtained from a conventional two-section ex-core detector system, the detectors are preferrably positioned with respect to the reactor vessel 10 and the surrounding concrete shielding environment in such a manner that the nominal fields of vision of the top and bottom sensors of the two-section ex-core detector system, respectively, overlap when projected on the core elevation. Underlapping fields of vision would accomplish the same result, but are undesirable for other unrelated reasons. In fact, it has been determined that the optimum configuration and location of the ex-core two-section detector system, for example the ex-core detector system 35 or 36 shown in FIG. 1, is one in which the field of vision of the top sensor of detector system 35 or 36 extends from a point 0.33 times core height above the core bottom to the top of the core and the field of vision of the bottom sensor extends from the bottom of the core to a point 0.67 times core height above the bottom of the core. Nevertheless, any two-section excore detector system that yields a slope in the range of about 1.2 to about 2.0 in the conventional in-core to ex-core axial offset calibration is acceptable for use (This slope is taken from eqn. (5) above).

As described above, embodiments of the present invention utilize information derived from signals which measure the reactor coolant temperatures at the reactor inlet and at the reactor outlet in the peripheral region near the ex-core detector system to evaluate the expansion coefficients of eqn. (6). Alternatively, any other available analog or digital signal proportional to core thermal power level in the appropriate peripheral region of the core can be substituted for the coolant temperature signals.

Thus, to restate the synthesis formulation of eqn. (6) for the locally averaged peripheral axial power distribution for a particular ex-core detector:

$$p_j = A'_{1j} * DR_t + A'_{2j} * DR_b + \sum_{n=1}^{N} \{A'_{n3j} * \Delta h_n\} \tag{7}$$

where $DR_t$ and $DR_b$ are the values of the sensor signals received from the top section and the bottom section, respectively, of a two-section long ion chamber, and $h_n$ is the absolute enthalpy rise, core outlet—core inlet, indicated by the n selected core-exit thermocouples near the peripheral portion of the core "seen" by the ex-core detector system. $A'_{n3j}$ includes a weighting factor for the enthalpy rise to account for geometric, hydraulic and thermal effects. In the preferred embodiment of the present invention we have elected to use, for purposes of evaluating eqn. (7), the following:

$$p_j = A'_{1j} * DR_t + A'_{2j} * DR_b + A'_{3j} * \Delta h_n \tag{8}$$

-continued $$\overline{\Delta h_n} = \sum_{n=1}^{N} (\Delta h_n * W_n) \quad (9)$$

where $\overline{\Delta h_n}$ is the average absolute enthalpy rise in the peripheral portion of the core "seen" by the ex-core detector system ($W_n$ is a weighting factor that explicitly accounts for the differences in the contributions of the several local peripheral fuel assemblies to the detector signals). Also note that the detector responses $DR_t$ and $DR_b$ have been corrected for temperature shadowing. This step is accomplished as described hereinbelow.

Figure 5:
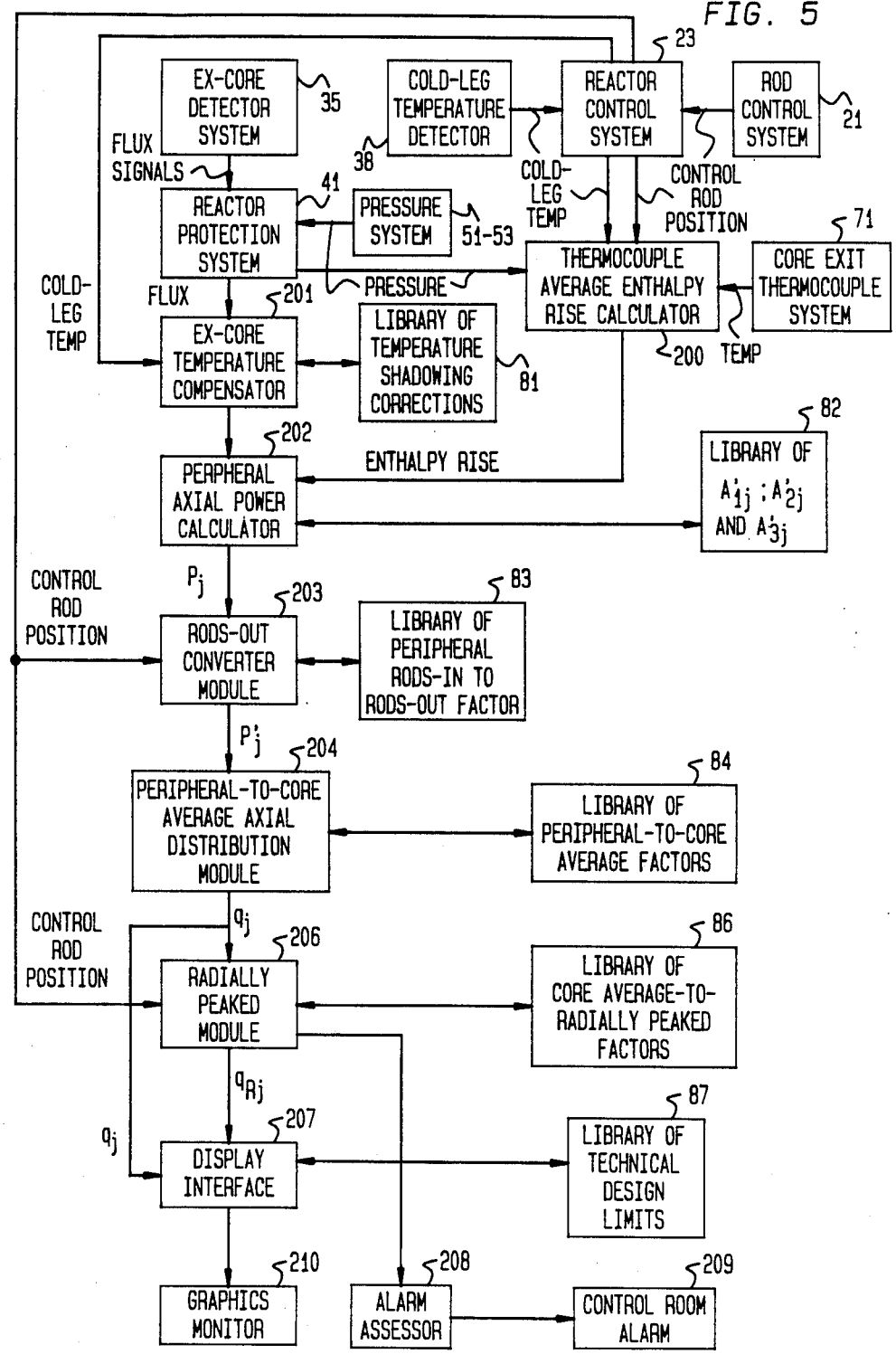
FIG. 5 shows a block diagram of an embodiment of the inventive system.

As shown in FIG. 5, the neutron flux signals generated by the two-section detector system 35 are transmitted to the reactor protection system 41 and from there to Ex-core Temperature Compensator 201. Temperature indications from cold-leg temperature detector 38 are transmitted to the reactor control system 23 and from there to Ex-core Temperature Compensator 201. Ex-core Temperature Compensator 201, accesses library 81 of temperature shadowing corrections and outputs the detector responses corrected for temperature shadowing in the manner specified in the appendix, i.e. it compensates the detector signals for the effects of changes in coolant density in the reactor vessel "downcomer" on neutron transmission. Library 81 is created in the manner set forth in the appendix. The "corrected" detector responses are input into Peripheral Axial Power Calculator 202.

Reactor coolant system pressure indications from pressure system 51-53 are transmitted to the reactor protection system 41 and from there to Thermocouple Average Enthalpy Rise Calculator 200. The core-exit temperature values computed in core-exit thermocouple system 71 are transmitted to Thermocouple Average Enthalpy Rise Calculator 200. Thermocouple Average Enthalpy Rise Calculator 200 then converts the inputs into enthalpy rise values for the coolant passing through the core in the fuel assemblies at which actual thermocouples are positioned using methods well known in the art. Then, Thermocouple Average Enthalpy Rise Calculator 200 computes the average enthalpy rise in the peripheral region of the core 5 which is "seen" by the ex-core detector. The output of Thermocouple Average Enthalpy Rise Calculator is input into Peripheral Axial Power Calculator 202.

Peripheral Axial Power Calculator 202 then accesses library 82 for constants $A'_{1j}$, $A'_{2j}$, and $A'_{3j}$ and evaluates eqn. (8) to output the local peripheral axial power distribution $p_j$ to Rods-Out Converter Module 203. Library 82 is created in the manner set forth in the appendix.

Rods-Out Converter Module 203, accepts control rod positions from Reactor Control System 23, accesses library 83 for peripheral rods-in to rods-out factors and computes $p'_j$. $p'_j$ is the local peripheral axial power distribution which would result if all the control rods 14 were pulled out of the core 5. The factors are multipliers at the successive core elevations that relate $p_j$ to $p'_j$ at successive elevations. Different factors are needed depending on the existing control rod arrangement at each elevation. Library 83 is created in the manner set forth in the appendix. $p'_j$ is the input into Peripheral-to-Core Average Axial Distribution Module 204.

As is well known in the art, there is a relation between the core average axial power at various elevations and the locally averaged axial peripheral power. (Even if there is no analytical expression, a numerical relationship between the two functions can be computed and the relationship stored in a computer memory or on a computer peripheral storage device such as a magnetic disk. Then one can go from one to the other by means, for example of a table look-up procedure well known in the art). Peripheral-to-Core Average Axial Distribution Module 204 accesses library 84 of peripheral-to-core factors to compute $q_j$, the core average axial power distribution. The factors are multipliers at the successive core elevations that relate $p'_j$ to $q_j$ at successive elevations. Library 84 is created in the manner set forth in the appendix. The core average axial distribution is input into Radially Peaked Module 206.

Radially Peaked Module 206, accepts control rod positions from Reactor Control System 23, accesses library 86 for core average-to-radially peaked factors to compute $q_{Rj}$, the radially peaked axial core distribution. The factors are multipliers at the successive core elevations that relate $q_j$ to $Q_{Rj}$ at successive elevatons. Different factors are needed depending on the existing control rod arrangement at each elevation. Library 86 is created in the manner set forth in the appendix.

In one embodiment of the present invention, the libraries are stored in computer memory, in another embodiment, they are stored on computer peripheral equipments such as magnetic disk storage. In addition, it will be apparent that the preferred embodiment of the present invention comprises a set of computational algorithms and computational control logic embodied in computer software which is executed on a digital computer.

In this embodiment of the present invention $q_j$ and $Q_{Rj}$ are input into Display Interface 207. Display Interface 207 accesses library 87 of technical design limits and outputs signals to Graphics Monitor 210 to display various quantities. Library 87 is created in the manner set forth in the appendix. For example, one display shows the core average axial power distribution; another display shows the radially peaked core power distribution; other displays combine the previous displays with a display of the technical design limits so that it becomes apparent whether the reactor is in danger of exceeding one or more of them —the location and margin at the most nearly limiting elevation would also be indicated. In addition, the Display Interface 207 transmits values of the displayed parameters to Alarm Assessor 208. If any of the technical design limits is being approached by a pre-selected amount, Alarm Assessor generates a signal to Control Room Alarm 209. Control Room Alarm 208 sets off a visual alarm such as a blinking red light or sets off an audio alarm such as a siren.

In addition, Display Interface 207 may accept the values of $q_j$ and $q_{Rj}$ as computed from various ex-core detectors and their "associated" core-exit thermocouples, typically there are four ex-core detectors like ex-core detector 35 arranged about the periphery of core 5. In this instance, Display Interface 207 may average the values of the distributions as determined by a pre-selected group of ex-core detectors and their "associated" core-exit thermocouples.

In an additional feature of the present invention, the steps set forth in the appendix to generate the various libraries, for example the library of the coefficients $A'_{ij}$, are repeated on a periodic basis, for example, whenever a new in-core flux map is provided by operating the movable in-core flux system.

In an additional feature of this embodiment of the present invention, the above-mentioned core average axial power distribution and the radially peaked axial power distribution are computed and the above-described displays are generated many times a day. This occurs on a periodic basis as automatically set up in Display Interface 207 or upon request by operator input.

It should be clear to those skilled in the art that the method and apparatus of the present invention also apply to ex-core detectors having a multiplicity of sections greater than two.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof

APPENDIX—CALIBRATION

Library 81 of Temperature Shadowing Corrections

As has been described above, a correction must be applied to the ex-core detector responses to account for the fact that reactor coolant from the primary side of the steam generator 26 passes between the core and ex-core detectors such as ex-core detector system 35 before entering the core 5. Thus, the excore detector response is corrected for temperature changes by applying a factor that is proportional to the change in cold leg temperature determined by coldleg temperature detector 38. For example, in a manner well known in the art, let $T_f$ be the temperature correction factor:

$$T_f(t) = 1 + C_T[T_{cold}(t) - T_{cold}(ref)] \quad (10)$$

$C_T$ is a proportionality constant relating the fractional change in indicated neutron flux power for a one degree temperature change and $T_{cold}(ref)$ is an appropriate constant.

The library of temperature correction factors are determined in accordance with methods well known in the art such as by making experimental measurements for the particular type of ex-core detector used in the application. Then these correction factors may be stored in a computer memory or on computer peripheral storage equipment in a manner well known in the art.

Library 82 of Constants $A'_{1j}$, $A'_{2j}$, and $A'_{3j}$

The constants $A'_{1j}$, $A'_{2j}$, and $A'_{3j}$ are determined by performing the well known least squares fitting method on the appropriate equation, for example eqn. (8) shown above, at each axial level of the core 5. In general there is no explicit analytical relation between the values of the various $A'_{ij}$. Then these values of $A'_{ij}$ stored in library 82.

With reference to eqn. (8), since there are three constants to evaluate at each axial elevation in the core, we need at least three values of $p_j$ at each elevation in order to obtain the constants. The values of $p_j$ are obtained from flux maps provided from three measurements. For example, it is essential to obtain flux maps when the reactor is operating at different power levels and preferrable when the xenon distribution is peaking at different axial locations in the core.

Figure 6:
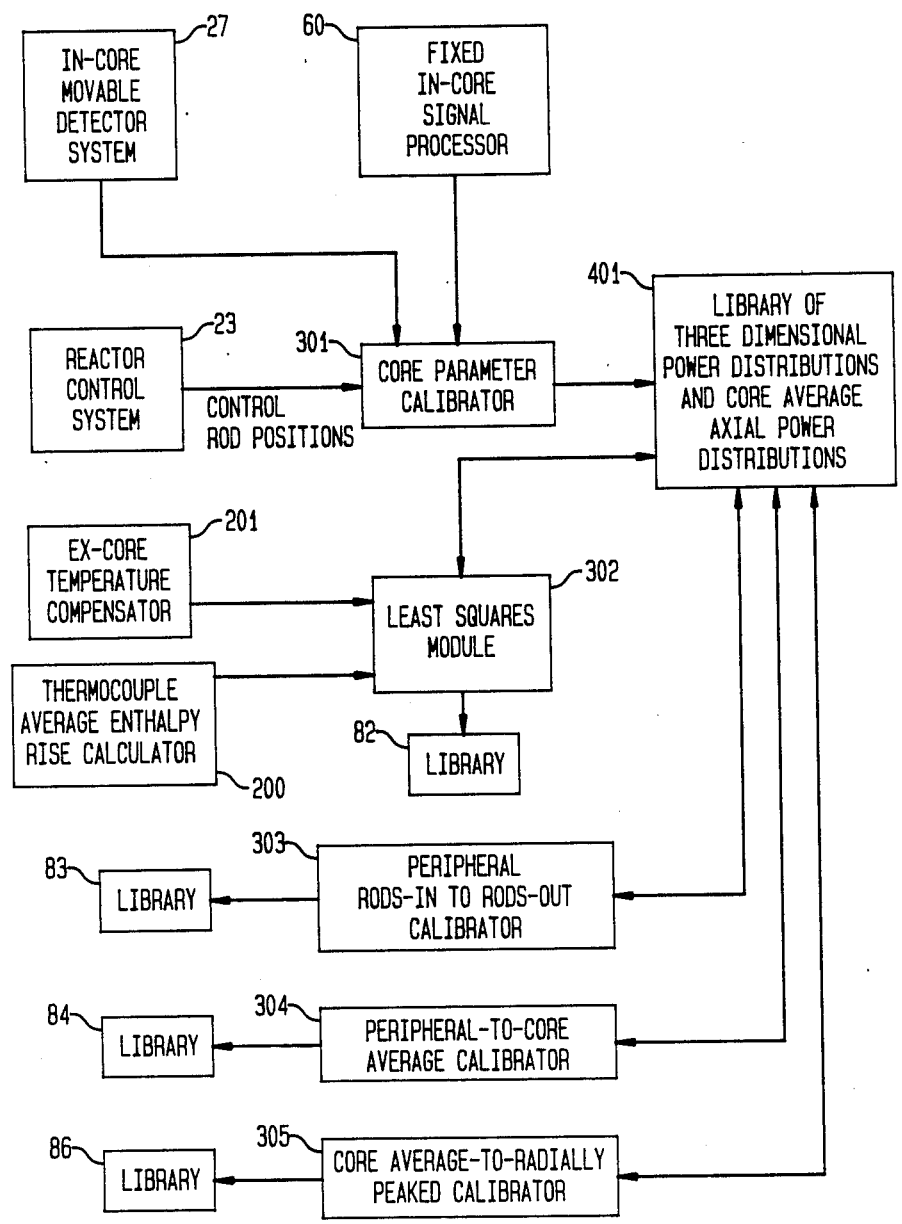
FIG. 6 shows a block diagram of an embodiment of a calibration portion of the inventive system.

With reference to FIG. 6, in-core movable detector system 27 inputs data to Core Parameter Calibrator 301 during the periodic flux mapping operations and generates the appropriate number for least squares fitting purposes of detailed three dimensional core power distributions and detailed core average axial power distributions. Appropriate computer codes for carrying out this function are in common use in PWR installations. Alternatively, a Fixed In-core Signal Processor 60 accepts signals generated by the strings of fixed in-core neutron or gamma ray detectors, when provided, and generates a detailed three dimensional core power distribution and a detailed core average axial power distribution. This alternative is only applicable in those PWR installations equipped with a full compliment of fixed in-core detectors. In either event, the detailed three dimensional core power distributions and the detailed core average axial power distributions are stored by Core Parameter Calibrator 301, along with the control rod positions, cold and hot-leg temperatures, and power levels used in making the maps, in library 401.

Then, Least Squares Module 302 accesses the values stored in library 401 and computes appropriate values of locgally averaged peripheral axial power $p_j$ for the various peripheral regions of interest in the particular installation. These values of $p_j$ at each elevation are used to perform the least squares fit for eqn. (8). The Least Squares Module 302 also accesses the average enthalpy rise values from Thermocouple Average Enthalpy Rise Calulator 200 determined during the time when the various flux maps were made. In addition, Least Squares Module 302 also accesses the detector responses from Ex-Core Temperature Compensator 201 obtained during the time when the various flux maps were made. As a result of performing the least Squares fit at each axial level, the constants $A'_{1j}$, $A'_{2j}$, and $A'_{3j}$ are determined and stored in library 82. These constants factors may be stored in a computer memory or on computer peripheral storage equipment in a manner well known in the art. It should be noted that the shape annealing calibration is automatically produced in the course of the above-described least squares fit and no separate computation need be made therefor.

Library 83 of Peripheral Rods-In To Rods-Out Factors

The factors relating the peripheral axial power distribution $p_j$ with $p'_j$, the distribution had there been no rods in the core 5, are multiplicative constants which are determined by comparing measured values of $p_j$ with measured values or computed values of $p'_j$. In practice, the measured values of $p'_j$ are obtained when a periodic flux map is made when all the control rods have been removed from the core 5. However, if the flux maps were not made for that case, one may compute the "unrodded" core power distribution by means well known in the art to produce such a map. Then, Peripheral Rods-In to Rods-Out Calibrator 303 accesses library 401 for core power distribution information and determines $p'_j$ from the rodless core power distribution in the same manner as described for least squares module 302 with reference to library 82. Then the factors for each axial level and for the various control rod positions are computed and stored in library 83. These constant factors may be stored in a computer memory or on computer peripheral storage equipment in a manner well known in the art. It should be noted that the rod shadowing calibration is automaticaly produced in the course of producing the calibration constants in the above-described manner.

Library 84 of Peripheral-to-Core Average Factors

The factors relating the "unrodded" peripheral axial power distribution $p'_j$ with the core average axial power distribution $q_j$ are multiplicative constants which are determined by comparing the values of $p'_j$, obtained as described with reference to library 82, with measured or computed values of $q_j$. In practice, the measured values of $q_j$ are obtained when a periodic flux map is made. Then, Peripheral-to-Core Average Calibrator 304 accesses library 401 for the core average power distribution information and information to produce $p'_j$. Using these data, Calibrator 304 computes and stores the calibration for each axial level in library 84. These constants factors may be stored in a computer memory or on computer peripheral storage equipment in a manner well known in the art.

Library 86 of Core Average-to-Radially Peaked Factors

The factors relating the core average axial power distribution $q_j$ with the radially peaked axial power distribution $q_{Rj}$ are multiplicative constants which are determined by comparing the values of $q_j$ with measured or computed values of $q_{Rj}$. In practice, the measured values of $Q_{Rj}$ are obtained when a periodic flux map is made. Then, Core Average-To-Radially Peaked Calibrator 306 access library 401 for the core average power distribution information. Using these data, Calibrator 306 computes and stores the calibration for each axial level and for the various control rod positions in library 86. These constants factors may be stored in a computer memory or on computer peripheral storage equipment in a manner well known in the art. It should be noted that the rod shadowing calibration is automaticaly produced in the course of producing the calibration constants in the above-described manner.

Library 87 of Technical Design Limits

The library of technical design limits are input to the system for storage in a computer memory or on computer peripheral storage equipment in a manner well known in the art. The appropriate values are commonly derived from the Technical Specification section of the plant Operating License.

What is claimed is:

1. A method of monitoring the power distribution along a given axis of a core of a nuclear reactor in a manner to representively reconstruct the relative power distribution shape along the given axis which comprises the steps of :
   monitoring peripheral flux emanating from a core guadrant and from the core periphery at positions exterior of the core with the core periphery comprising no more than about two fuel assembly widths from an edge of the core;
   monitoring the temperasture of reactor coolant flowing into the core and the temperature of the reactor coolant exiting the core at a location approximately corresponding to the source monitored flux;
   determining the power distribution in response to the peripheral flux measurements and the temperature measurements; and
   displaying the power distribution.

2. The method of claim 1 wherein:
   the step of flux monitoring further comprises monitoring the flux with at least two detectors, each detecting flux from a core quadrant and each of which is located substantially along an axis which is substantially parallel to the given axis; and
   the step of temperature monitoring further comprises monitoring the temperature of reactor coolant exiting the core in the core periphery from which the substantial portion of the detected flux emanates.

3. The method of claim 2 which further comprises the steps of:
   generating a signal representative of a pre-selected limit on the magnitude of the power distribution; and
   displaying the limit signal to generate a visual indication of the limit in a manner which represents a visual comparison between the current value of the power distribution and the limiting signal.

4. The method of claim 3 which further comprises the step of setting off an alarm when the difference between the current value of the power distribution and the limiting signal is within a pre-selected amount.

5. The method of claim 2 wherein the step of determining the power distribution comprises the steps of:
   determining the power distribution in the core periphery; and
   determining the power distribution in the core from the power distriution in the core periphery.

6. The method of claim 5 wherein the step of determining the power distribution in the core periphery comprises evaluating a linear realtion among the responses of the flux measurements from the at least two detectors and a parameter generated from the temperature measurements.

7. The method of claim 6 further comprising the step of determining the pressure of the reactor coolant system and wherein the linear relation for the step of determining the power distribution in the core periphery, where the flux measurements are gathered from two detectors, each detecting flux from a core quadrant, is given by:

$$p_j = A_{1j} * [\text{Detector Response}]_1 +$$
$$A_{2j} * [\text{Detector Response}]_2 + \ldots +$$
$$A_{3j} * f(T_{exit}, T_{ent}, \text{pressure})$$

where $p_j$ is the power distribution in the core periphery at a pre-selected elevation value j along the given axis; $f(T_{exit}, T_{ent}, \text{pressure})$ is a function of $T_{ent}$, the temperature of the reactor coolant entering the core periphery, $T_{exit}$, the temperature of the reactor coolant exiting the core periphery, and pressure, the reactor system coolant pressure; and $A_{1j}$, $A_{2j}$, and $A_{3j}$ are predetermined constants.

8. The method of claim 7 wherein $f(T_{exit}, T_{ent}, \text{pressure})$ is the enthalpy change in the reactor coolant in the core periphery.

9. The method of claim 8 wherein $A_{1j}$, $A_{2j}$, and $A_{3j}$ are determined by means of a least squares fit of the equation for $p_j$ which uses data obtained from an incore flux monitoring instrumentation system.

10. The method of claim 9 wherein the flux is monitored by two detectors whose field of vision for the flux overlaps along the given axis.

11. The method of claim 9 wherein the flux is monitored by two detectors whose field of vision for the flux underlaps along the given axis.

12. The method of claim 10 wherein the field of vision of one detector extends from a point substantially equal to 0.33 times core height above the core bottom to the top of the core and the field of vision of the other detector extends from the bottom of the core to a point substantially equal to 0.67 times core height above the bottom of the core.

13. The method of claim 9 wherein the quantity AO, defined as:

$$AO=(P_t-P_b)/(P_t+P_b)$$

where $P_t$ and $P_b$ are the fractions of power generated in the top and bottom halves of the core, respectively, is related to the flux measurements from the two detectors in the following manner:

$$AO=(I_t-I_b)/(I_t+I_b) * \text{slope} + \text{constant}$$

where $I_t$ and $I_b$ are the detector responses from detector 1, which measures flux emanating from an upper portion of the core, and from detector 2, which measure flux emanating from a lower portion of the core, respectively, and the slope is substantially in the range of 1.2 to 2.0.

14. A method of monitoring the power distribution along a given axis of a core of a nuclear reactor which comprises the steps of:
monitoring peripheral flux emanating from the core periphery with at least two detectors at positions exterior of the core, each detecting flux from a core quadrant and each of which detectors is located substantially along an axis substantially parallel to the given axis with the core periphery comprising no more than about two fuel assembly widths from an edge of the core;
monitoring the temperature of reactor coolant flowing into the core, the temperature of the reactor coolant exiting the core in the core periphery from which a substantial portion of the detected peripheral flux emanates, and the coolant pressure of the reactor coolant system;
determining the peripheral power distribution in the core periphery according to:

$$p_j = A_{1j} * (\text{Detector Response})_1 +$$
$$A_{2j} * (\text{Detector Response})_2 + \ldots +$$
$$A_{nj} * f(T_{exit}, T_{ent}, \text{pressure})$$

where $p_j$ is the power distribution in the core periphery at a pre-selected elevation value j along the given axis; $f(T_{exit}, T_{ent}, \text{pressure})$ is a function of $T_{ent}$, the temperature of the reactor coolant entering the core periphery, $T_{exit}$, the temperature of the reactor coolant exiting the core periphery, and pressure, the rector system coolant pressure; and $A_{1j}$, $A_{2j}$, and $A_{nj}$ are predetermined constants;
determining the axial power distribution in the core from the peripheral power distribution;
determining the axial offset defined as:

$$AO=(P_t-P_b)/(P_t+P_b)$$

from the axial power distribution, where $P_t$ and $P_b$ are the fraction of power generated in the top and bottom half of the core, respectively; and
displaying the axial offset.

15. The method of claim 14 which further comprises the steps of:

determining the axial flux difference $P_t-P_b$ from the power distribution; and
dispalying the axial flux difference.

16. Apparatus for monitoring the power distribution along a fiven axis of a core of a nuclear reactor in a manner to provide a representative reconstruction of the relative flux shape along the given axis which comprises:
means, positioned exterior of the core, for measuring peripheral flux emanating from a core quadrant and from the core periphery with the core periphery comprising no more than aobut two fuel assemlby widths from an edge of the core;
means for monitoring the temperature of reactor coolant flowing into the core and the temperature of the reactor coolant exiting the core periphery;
means for determining the power distribution in response to the peripheral flux measurements and the peripheral temperature measurements; and
means for displaying the power distribution.

17. The apparatus of claim 16 wherein the flux measuring measn comprises at least two detectors, each detecting flux from a core quadrant and each of which is located substantially along an axis substantially parallel to the given axis; and
the means for monitoring the temperature of reactor coolant exiting the core monitors the temperature of the reactor coolant exiting the core in the core periphery from which the substantial portion of the detected flux emanates.

18. The apparatus of claim 17 wherein the means for determining the power distribution comprises:
means for determining the peripheral power distribution in the peripheral region of the core; and
means for determining the axial power distribution in the core in response to the peripheral power distribution in the peripheral region.

19. The apparatus of claim 18 further comprising means for determining the pressure of the reactor coolant system and wherein the flux measuring means comprises two detectors and the means for determining the power distribution in the core periphery comprises means for computing the power distribution in accordance with:

$$p_j = A_{1j} * (\text{Detector Response})_1 +$$
$$A_{2j} * (\text{Detector Response})_2 + \ldots +$$
$$A_{3j} * f(T_{exit}, T_{ent}, \text{pressure})$$

where $p_j$ is the power distribution in the core periphery at a pre-selected elevation value j along the given axis; f is a function of $T_{ent}$, the temperature of the reactor coolant entering the core periphery, $T_{exit}$, the temperature of the reactor coolant exiting the core periphery, and pressure, the reactor system coolant pressure; and $A_{1j}$, $A_{2j}$, and $A_{3j}$ are predetermined constants.

20. The apparatus of claim 19 which further comprises:
means for generating a signal representative of a limit on the magnitude of the power distribution; and
means for displaying the limit signal to generate a visual indication of the limit in a manner which represents a visual comparison between the current value of the power distribution and the limiting signal.

21. The apparatus of claim 20 wherein the display means comprises a cathode ray display.

22. The apparatus of claim 21 which further comprises means for setting off an alarm when the difference between the current value of the power distribution and the limiting signal is within a pre-selected amount.

23. A method of monitoring the power distribution along a given axis of a core of a nuclear reactor in a manner to representatively reconstruct the relative power distribution shape along the given axis which comprises the steps of:
- monitoring peripheral flux emanating from the core periphery at positions exterior of the core with at least two detectors, each detector detecting flux from a core quadrant and each of which detectors is located substantially along an axis substantially parallel to the given axis with the core periphery comprising no more than about two fuel assembly widths from an edge of the core;
- monitoring a signal proportional to the core peripheral thermal power in the core periphery from which a substantial portion of the monitored flux emanates;
- determining the peripheral power distribution in the core periphery, responsive to the peripheral flux measurements and the signal, from a linear relation among the responses of the peripheral flux measurements and the signal;
- determining the power distribution in the core from the peripheral power distribution; and
- presenting the power distribution.

24. The method of claim 23 wherein the step of presenting comprises presenting the power distribution to means for displaying the power distribution.

25. The method of claim 24 which further comprises the steps of:
- generating a signal representative of a pre-selected limit on the magnitude of the power distribution; and
- displaying the limit signal to generate a visual indication of the limit in a manner which represents a visual comparison between the current value of the power distribution and the limiting signal.

26. The method of claim 25 wherein the step of monitoring a signal comprises monitoring temperature measruements from core-exit assembly thermocouples.

27. A method of monitoring the power distribution along a given axis of a core of a nuclear reactor in a manner to representatively reconstruct the relative radially peaked power distribution shape along the given axis which comprises the steps of:
- monitoring peripheral flux emanating form the core periphery at positions exterior of the core with at least two detectors, each detector detecting flux from a core quadrant and each of which detectors is located substantially along an axis substantially parallel to the given axis with the core periphery comprising no more than about two fuel assembly widths from an edge of the core;
- monitoring a signal proportional to the core peripheral thermal power in the core periphery from which a substantial portion of the monitored flux emanates;
- determining peripheral power distribution in the core periphery, responsive to the peripheral flux measurements and the signal, from a linear relation among the responses of the peripheral flux measurements and the signal;
- determining axial power distribution in the core form the peripheral power distribution;
- determining the radially peaked power distribution; and
- displaying the radially peaked power distribution.

28. The method of claim 27 which further comprises the steps of:
- generating a signal representative of a pre-selected limit on the magnitude of the radially peaked power distribution; and
- displaying the limit signal to generate a visual indication of the limit in a manner which represents a visual comparison between the current value of the radially peaked power distribution and the limiting signal.

29. A method of determining axial power distribution in a reactor core, comprising:
- measuring peripheral core flux in the core periphery at two locations with the core periphery comprising no more than about two fuel assembly widths from an edge of the core within a core quadrant;
- measuring core coolant inlet temperature;
- measuring core coolant exit temperature of the coolant exiting fuel rod assemblies in the core periphery;
- determining enthalpy change in the core periphery from the inlet temperature and the exit temperature; and
- determining core peripheral axial power distribution from the enthalpy change and the peripheral core flux.

30. An apparatus for determining axial power distribution in a reactor core, comprising:
- at least two neutron detectors located at different axial positions and measuring flux in acore quadrant in the core periphery with the core periphery comprising no more than about two fuel assembly widths from an edge of the core;
- an inlet temperature sensor measuring coolant inlet temperature as it enters the reactor;
- core exit temperature sensors positioned at coolant outlets of reactor assemblies in the core periphery and measuring coolant exit temperatures; and
- distribution means for producing local peripheral axial power distribution from the measured flux, the inlet temperature and the exit temperatures.

* * * * *